United States Patent
Wright et al.

(10) Patent No.: US 12,014,733 B2
(45) Date of Patent: Jun. 18, 2024

(54) MOMENT CAPTURING SYSTEM

(71) Applicant: GENTEX CORPORATION, Zeeland, MI (US)

(72) Inventors: Thomas S. Wright, Holland, MI (US); Eric P. Bigoness, Ada, MI (US)

(73) Assignee: GENTEX CORPORATION, Zeeland, MI (US)

( * ) Notice: Subject to any disclaimer, the term of this patent is extended or adjusted under 35 U.S.C. 154(b) by 200 days.

(21) Appl. No.: 17/332,009

(22) Filed: May 27, 2021

(65) Prior Publication Data

US 2021/0375283 A1    Dec. 2, 2021

Related U.S. Application Data

(60) Provisional application No. 63/030,385, filed on May 27, 2020.

(51) Int. Cl.
*G10L 15/22* (2006.01)
*G06V 20/59* (2022.01)
(Continued)

(52) U.S. Cl.
CPC .............. *G10L 15/22* (2013.01); *G06V 20/59* (2022.01); *G10L 15/26* (2013.01); *G10L 25/72* (2013.01);
(Continued)

(58) Field of Classification Search
None
See application file for complete search history.

(56) References Cited

U.S. PATENT DOCUMENTS 6,185,535 B1 * 2/2001 Hedin ..................... G10L 15/30
704/E15.047
6,420,975 B1 * 7/2002 DeLine ................ G06Q 20/341
381/86
(Continued)

FOREIGN PATENT DOCUMENTS

DE    102014208417 A1    11/2015
JP       2009508734 A     3/2009
(Continued)

OTHER PUBLICATIONS

International Search Report dated Sep. 9, 2021, for corresponding PCT application No. PCT/US2021/034436, 3 pages.
(Continued)

*Primary Examiner* — Neeraj Sharma
(74) *Attorney, Agent, or Firm* — Price Heneveld LLP; Brian James Brewer

(57) ABSTRACT

A vehicle occupant aid system is disclosed. The system may comprise a rearview assembly. Further, the rearview assembly may comprise a button. The system may further comprise one or more data capturing element. Each element may be a microphone, an imager, a location device, and/or a sensor. In some embodiments, a controller may record the data for a predetermined period of time. Further, the controller may transmit information to a remote device based upon initiation of a trigger. The information being based, at least in part, on the data. In other embodiments, the controller may operability record the data in response to a first operation of the button. Further, the controller may transmit information to a remote device based upon a second operation of the button. The information being based, at least in part, on the data recorded between the first and second operations of the button.

20 Claims, 1 Drawing Sheet

(51) Int. Cl.
*G10L 15/26* (2006.01)
*G10L 25/72* (2013.01)

(52) U.S. Cl.
CPC .. *G10L 2015/221* (2013.01); *G10L 2015/223* (2013.01)

(56) References Cited

U.S. PATENT DOCUMENTS

| | | | | |
|---|---|---|---|---|
| 6,501,387 | B2* | 12/2002 | Skiver | B60Q 3/258 340/425.5 |
| 6,513,833 | B2* | 2/2003 | Breed | B60R 25/25 180/272 |
| 6,601,029 | B1 | 7/2003 | Pickering | |
| 7,926,960 | B2* | 4/2011 | Skiver | B60R 11/0217 359/603 |
| 8,154,418 | B2* | 4/2012 | Peterson | G06F 3/04886 348/148 |
| 9,736,699 | B1* | 8/2017 | Rao | H04W 76/16 |
| 10,549,695 | B1* | 2/2020 | Englander | H04N 23/661 |
| 10,783,889 | B2* | 9/2020 | Ramic | G06F 3/167 |
| 10,814,789 | B2* | 10/2020 | Englander | H04N 5/268 |
| 2002/0032510 | A1* | 3/2002 | Turnbull | H01Q 1/3266 701/49 |
| 2003/0117728 | A1* | 6/2003 | Hutzel | B60R 1/12 359/850 |
| 2006/0132939 | A1* | 6/2006 | Blank | B60R 1/12 359/838 |
| 2006/0164230 | A1* | 7/2006 | DeWind | B60K 35/10 340/461 |
| 2008/0212189 | A1* | 9/2008 | Baur | B60R 1/088 362/540 |
| 2012/0098968 | A1 | 4/2012 | Schofield et al. | |
| 2012/0224768 | A1* | 9/2012 | Lee | G06F 16/5838 382/165 |
| 2018/0060269 | A1* | 3/2018 | Kessler | G06F 13/4022 |
| 2018/0253141 | A1 | 9/2018 | McCracken | |
| 2019/0049942 | A1* | 2/2019 | Dusane | G10L 15/22 |
| 2019/0333409 | A1 | 10/2019 | Simmons et al. | |

FOREIGN PATENT DOCUMENTS

| | | |
|---|---|---|
| JP | 2012123492 A | 6/2012 |
| JP | 2017223666 A | 12/2017 |
| KR | 200152956 Y1 | 8/1999 |
| WO | 2014124889 A1 | 8/2014 |

OTHER PUBLICATIONS

Written Opinion dated Sep. 9, 2021, for corresponding PCT application No. PCT/US2021/034436, 5 pages.

* cited by examiner

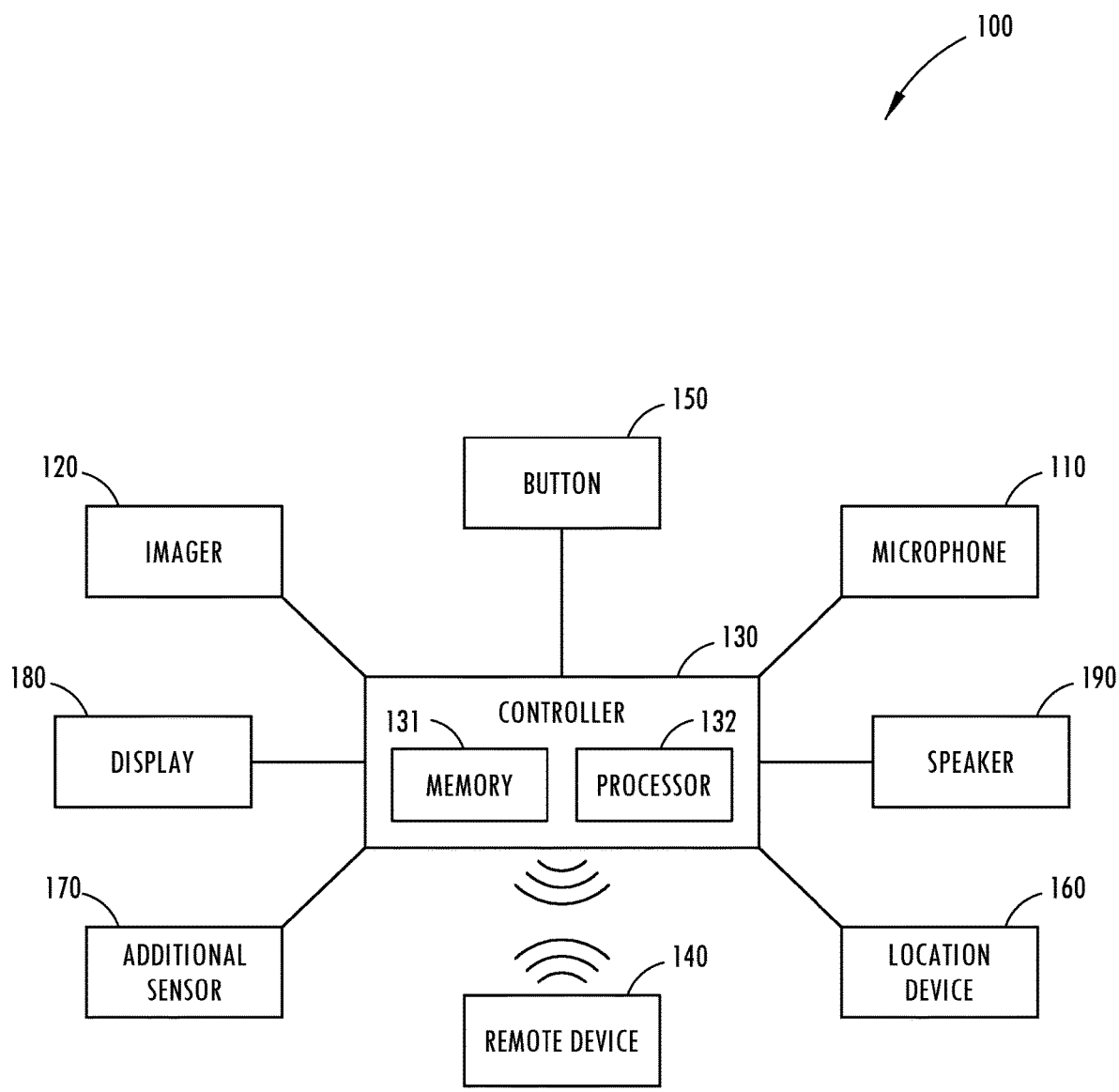

MOMENT CAPTURING SYSTEM

CROSS-REFERENCE TO RELATED APPLICATIONS

This application claims priority under 35 U.S.C. § 119(e) to U.S. Provisional Application No. 63/030,385 filed on May 27, 2020, entitled "MOMENT CAPTURING SYSTEM," the disclosure of which is hereby incorporated by reference in its entirety.

FIELD OF INVENTION

The present invention relates in general to vehicle occupant aid systems and, more particularly, to systems for aiding occupants in a social capacity.

BACKGROUND OF INVENTION

When in a moving vehicle, information often passes quickly, making it difficult for a driver to process and remember all of it. Social information is particularly difficult for a driver to process and remember as their focus is primarily on the road ahead of them. Audio from a radio, conversations inside the vehicle, passing signs, and/or passing storefronts can quickly become lost if not recorded. Beyond merely recording dash cam footage, there is a need to understand and process the environment within and/or outside of the vehicle to convey a snapshot of a moment in time to a user. Accordingly, there is a need for improved occupant aid systems.

SUMMARY

In accordance with the present disclosure, the problems associated with drivers having difficulties processing and remembering social information not directly related to driving the vehicle have been substantially reduced or eliminated.

According to one aspect of the present disclosure, a system is disclosed. The system may comprise a rearview assembly, a microphone, and a controller. The rearview assembly may be operable to provide a user with a view rearward relative a vehicle under normal operating conditions. Additionally, the rearview assembly may comprise a button. In some embodiments, the button may be a physical hard key button. In other embodiments, the button may be a touchscreen soft key style button. The controller may be communicatively connected to the button and the microphone. Further, the controller may be operable to record sound from the microphone for a predetermined period of time and to transmit information to a remote device based, at least in part, upon initiation of a trigger. In some embodiments, operation of the button is the trigger. In some embodiments, the remote device may be a mobile personal communications device. The information may be based, at least in part, on the recorded sound. In some embodiments, the recorded sound may be stored by the controller at the time of the trigger initiation.

In some embodiments, the controller may be further operable to convert the recorded sound to text. In some such embodiments, the information may be further based, at least in part, on the text.

In some embodiments, the controller may be further operable to analyze the recorded sound to determine or identify at least one of a question and command from a user. In some such embodiments, the trigger may be based, at least in part, on the at least one of the question and the command. In other such embodiments, the transmitted information may be based, at least in part, on the at least one of the question and the command.

In some embodiments, the system may further comprise a location device. The location device may be communicatively connected to the controller. Further, the location device may be operable to determine a position of the vehicle. In some such embodiments, the controller may be further operable to record the position for the predetermined period of time. Additionally, in some such embodiments, the information may be further based, at least in part, on the position.

In some embodiments, the system may further comprise an imager. The imager may be communicatively connected to the controller. Further, the imager may be operable to capture one or more images. In some such embodiments, the controller may be further operable to record the one or more images for the predetermined period of time. Additionally, the information may be further based, at least in part, on the one or more images. In some embodiments, the imager may have a field of view of an interior of the vehicle. In other such embodiments, the controller may be further operable to analyze the one or more images to determine a response. The response may be based, at least in part, on the one or more images. Further, the transmitted information may be further based, at least in part, on the response.

According to another aspect of the present disclosure, a system is disclosed. The system may comprise a rearview assembly, an imager, and a controller. The rearview assembly may be operable to provide a user with a view rearward a vehicle under normal operating conditions. Further, the rearview assembly may comprise a button. In some embodiments, the button may be a physical hard key button. In other embodiments, the button may be a touchscreen soft key style button. The imager may be operable to capture one or more images. The controller may be communicatively connected to the button and the imager. Additionally, the controller may be operable to record the one or more images for a predetermined period of time and to transmit information to a remote device based, at least in part, upon initiation of a trigger. In some embodiments, the remote device may be a mobile personal communications device. In some embodiments, operation of the button may be the trigger. In some embodiments, the information may be based, at least in part, on the recorded one or more images. In some embodiments, a field of view of the imager may be interior the vehicle.

In some embodiments, the system may further comprise a location device. The location device may be communicatively connected to the controller. the location device may be operable to determine a position or location of the vehicle. In some such embodiments, the controller may be further operable to record the position for the predetermined period of time. Additionally, the information may be further based, at least in part, on the position.

In some embodiments, the system may further comprise one or more sensors. The one more sensors may include one or more of an accelerometer, a speedometer, a compass, an ambient light sensor, a thermometer, and/or a clock. In some such embodiments, the controller may be further operable to record data from the one or more sensor for the predetermined period time. Additionally, the information may be further based, at least in part, on the data.

According to yet another aspect of the present disclosure, a system is disclosed. The system may comprise a rearview assembly, a microphone, and a controller. The rearview assembly may be operable to provide a user with a view rearward relative a vehicle under normal operating conditions. Additionally, the rearview assembly may comprise a button. In some embodiments, the button may be a physical hard key button. In other embodiments, the button may be a touchscreen soft key style button. The controller may be communicatively connected to the button and the microphone. Additionally, the controller may be operable to record sound from the microphone in response to a first operation of the button and to transmit information to a remote device based, at least in part, upon a second operation of the button. In some embodiments, the remote device may be a mobile personal communications device. In some embodiments, the information may be based, at least in part, on the sound recorded between the first and second operations of the button.

In some embodiments, the controller may be further operable to convert the recorded sound to text. In some such embodiments, the information may be further based, at least in part, on the text.

In some embodiments, the controller may be further operable to analyze the recorded sound to determine or identify at least one of a question and command from a user. In some such embodiments, the information may be based, at least in part, on the at least one of the question and the command.

In some embodiments, the system may further comprise a location device. The location device may be communicatively connected to the controller. Further, the location device may be operable to determine a position of the vehicle. In some such embodiments, the controller may be further operable to record the position based, at least in part, on the first operation of the button. Additionally, in some such embodiments, the information may be further based, at least in part, on the position.

In some embodiments, the system may further comprise an imager. The imager may be communicatively connected to the controller. Further, the imager may be operable to capture one or more images. In some such embodiments, the controller may be further operable to record the one or more images based, at least in part, to the first operation of the button. Additionally, the information may be further based, at least in part, on the one or more images. In some embodiments, the imager may have a field of view of an interior of the vehicle. In other such embodiments, the controller may be operable to analyze the one or more images to determine a response. The response may be based, at least in part, on the one or more images. Additionally, the information may be further based, at least in part, on the response.

In accordance with yet another aspect of the present disclosure, a system is disclosed. The system may comprise a rearview assembly, an imager, and a controller. The rearview assembly may be operable to provide a user with a view rearward relative a vehicle under normal operating conditions. Additionally, the rearview assembly may comprise a button. In some embodiments, the button may be a physical hard key button. In other embodiments, the button may be a touchscreen soft key style button. The imager may be operable to capture one or more images. In some embodiments, the imager may have a field of view interior the vehicle. The controller may be communicatively connected to the button and the imager. Further, the controller may be operable to record the one or more images based, at least in part, on a first operation of the button and to transmit information to a remote device based, at least in part, upon a second operation of the button. In some embodiments, the remote device may be a mobile personal communications device. The information may be based, at least in part, on the recorded one or more image recorded between the first and second operations of the button.

In some embodiments, the system may further comprise one or more sensors. The one more sensors may include one or more of an accelerometer, a speedometer, a compass, an ambient light sensor, a thermometer, and/or a clock. In some such embodiments, the controller may be further operable to record data from the one or more sensors based, at least in part, on a first operation of the button. Additionally, the information may be further based, at least in part, on the data recorded between the first and second operations of the button.

In accordance with yet another aspect of the present disclosure, a system is disclosed. The system may comprise a rearview assembly, a microphone, a speaker, and a controller. The rearview assembly may be operable to provide a user with a view rearward relative a vehicle under normal operating conditions. Additionally, the rearview assembly may comprise a button. In some embodiments, the button may be a physical hard key button. In other embodiments, the button may be a touchscreen soft key style button. The microphone may be operable to capture a sound. The speaker may be operable to emit an auditory response. The controller may be communicatively connected to the button, the microphone, and the speaker. Further, the controller may be operable to record the sound captured by the microphone for a period of time and to, upon initiation of a trigger, transmit an auditory response to the speaker. In some embodiments, operation of the button may be the trigger. The auditory response may be based, at least in part, on the recorded sound. In some embodiments, the period of time is a predetermined length of time substantially immediately prior to the initiation of the trigger.

In accordance with yet another aspect of the present disclosure, a system is disclosed. The system may comprise a rearview assembly, an imager, and a controller. The rearview assembly may be operable to provide a user with a view rearward a vehicle under normal operating conditions. Further, the rearview assembly may comprise a button and a display. In some embodiments, the button may be a physical hard key button. In other embodiments, the button may be a touchscreen soft key style button. The display may be operable to display a first image. Under some circumstances, the first image may have a field of view rearward relative the vehicle under normal operating conditions. Under other circumstances, the first image may be or be based, at least in part, on the second image. The imager may be operable to capture a second image. The second image may have a field of view of an interior the vehicle. The controller may be communicatively connected to the button, the imager, and the display. Further, the controller may be operable to record the second image captured by the imager for a period of time. Additionally, upon initiation of a trigger, the controller may be operable to transmit the first image to the display, the first image based, at least in part, on the second image.

These and other aspects, objects, and features of the present disclosure will be understood and appreciated by those skilled in the art upon studying the following specification, claims, and appended drawings. It will also be understood that features of each embodiment disclosed herein may be used in conjunction with, or as a replacement for, features in other embodiments.

BRIEF DESCRIPTION OF FIGURES

In the drawings:

FIG. 1: Schematic representation of an occupant aid system.

DETAILED DESCRIPTION

The specific devices and processes illustrated in the attached drawings and described in this disclosure are simply exemplary embodiments of the inventive concepts defined in the appended claims. Hence, specific characteristics relating the embodiments disclosed herein are not limiting, unless the claims expressly state otherwise.

Some embodiments of the present disclosure are directed to an improved occupant aid system for vehicles. The occupant aid system may be operable to capture and record data from a microphone, an imager, and/or one or more sensors. Further, information based, at least in part, on the recorded data may be transmitted to a remote device in response to a trigger condition, such as the press of a button. Accordingly, some embodiments of the occupant aid system may address the problems associated with an occupant's difficulty processing and remembering social information while driving.

FIG. 1 is a schematic representation of an occupant aid system 100 for aiding an occupant of a vehicle. Accordingly, occupant aid system 100 may be disposed in the vehicle. The occupant may be a driver. Further, occupant aid system 100 may comprise a microphone 110, an imager 120, and/or a controller 130. In some embodiments, one or more element of occupant aid system 100 may be incorporated into a rearview assembly.

The rearview assembly may be an element operable to provide a user with a view rearward relative the vehicle. In some embodiments, the rearview assembly may be comprise a display and/or a reflective surface. The display may be communicatively connected to a camera and operable to display one or more image captured by the camera. The rearview assembly may be disposed interior the vehicle in areas traditionally associated with interior rearview assemblies. For example, the rearview assembly may be centrally mounted to the vehicle's headliner or windshield.

Microphone 110 may be operable to capture sound from its environment. The sound may be a voice of one or more occupant of the vehicle and/or content from a radio. Further, microphone 110 may be disposed interior the vehicle. In some embodiments, microphone 110 may be incorporated into the rearview assembly.

Imager 120 has a field of view and may be operable to capture one or more images. In some embodiments, the field of view may be exterior the vehicle. In other embodiments, the field of view may be interior the vehicle. Additionally, the field of view may correspond with one or more occupant seat. In some such embodiments, the field of view may not have any substantial view exterior relative the vehicle. Accordingly, imager 120 may be disposed interior the vehicle. Further, in some embodiments, imager 120 may be incorporated into the rearview assembly.

Controller 130 is communicatively connected to microphone 110 and/or imager 120. In some embodiments, controller 130 may be incorporated into the rearview assembly. In other embodiments, controller 130 may be cloud based. Further, controller 130 may comprise multiple sub-controllers, such that part is located in the vehicle and the other is remotely disposed via a cloud. Controller 130 may comprise a memory 131 and/or a processor 132. Memory 131 may be operable to record sound from microphone 110. Additionally, memory 131 may be operable to record the one or more images from imager 120. Further, controller 130 may be operable to transmit information to a remote device 140 based, at least in part, upon initiation of a trigger. In some embodiments, the information may be based, at least in part, on the recorded sound. Accordingly, in some embodiments, the information may comprise the recorded sound. In other embodiments, the information may be based, at least in part, on the recorded one or more images. Accordingly, in some embodiments, the information may comprise the recorded one or more images.

Remote device 140 may be wirelessly, communicatively connected to controller 130. Further, remote device 140 may be remotely disposed relative the vehicle or freely moved remote the vehicle. In some embodiments, remote device 140 may be a mobile communications device, such as a cell phone. Additionally, remote device 140 may comprise a user interface operable to display the information to the occupant for viewing and interaction. Accordingly, the information may be sorted and accessed. The occupant may interact with the information by reviewing and/or sharing content of the information directly to one or more social media account. In some embodiments, remote device 140 may be further operable to intelligently focus information to find the beginning, end, and/or content of the information that corresponds to a moment desired by the user. The information may be intelligently focused based, at least in part, on a question and/or command from the user. For example, the user may ask or instruct the occupant aid system 100 to present content related to a specific parameter. In other embodiments, remote device 140 may be operable to perform a pattern recognition analysis to identify songs, speech, images, and/or individuals contained in the information. Alternatively, the pattern recognition analysis to identify songs, speech, images, and/or individuals contained in the information may be performed by controller 130. In such an embodiment, the results of the pattern recognition may be communicated to remote device 140 along with the information.

In some embodiments, occupant aid system 100 further comprises a button 150. Button 150 is communicatively connected to controller 130. Accordingly, actuation of button 150 may serve as the trigger. In some such embodiments, button 150 may be incorporated into the rearview assembly. In some embodiments, button 150 may be a mechanical button. In other embodiments, button 150 may be a touch responsive surface, such as a touchscreen or capacitive touch button.

In some embodiments where occupant aid system 100 comprises microphone 110, memory 131 may store an interpretation algorithm. The interpretation algorithm may be executed by processor 132. Further, the interpretation algorithm may be operable to analyze recorded sound and convert the recorded sound into text. In such an embodiment, the information may be further based, at least in part, on the text. Accordingly, in some embodiments, the information may comprise all or part of the text.

In some embodiments where occupant aid system 100 comprises microphone 110, memory 131 may store a speech recognition algorithm. The speech recognition algorithm may be executed by processor 132. Further, the speech recognition algorithm may be operable to analyze the recorded sound and determine the presence and content of a question and/or a command from a user. In some embodiments, the trigger may be based, at least in part, on the question and/or command. In other embodiments, the information may be based, at least in part, on the question and/or command. In some embodiments, the information may be based, at least in part, on a response to the question and/or command.

Further, in some embodiments where occupant aid system 100 comprises imager 120, memory 131 may store an image analysis algorithm. The image analysis algorithm may be executed by processor 132. Further, the image analysis algorithm may be operable to analyze one or more recorded images in accordance with the question and/or command. Accordingly, the response may be based, at least in part, on the one or more images.

In some embodiments, occupant aid system 100 may further comprise a location device 160. Location device 160 may be any device operable to determine a position of the vehicle. Location device 160 may be a global positioning system (GPS) unit or cellular triangulation unit. Additionally, location device 160 may be communicatively connected to controller 130. In some embodiments, location device 160 may be incorporated into the vehicle and/or the rearview assembly. In other embodiments, location device 160 maybe a mobile communications device, such as a cell phone. In some such embodiments, location device 160 may be comprised by remote device 140 in embodiments where remote device 140 is a mobile communications device. The mobile communications device may be communicatively connected, at least in part, to controller 130 via Wi-Fi, Bluetooth, radio, cellular, or other communications technology. Accordingly, the mobile communications device may be wirelessly connected to controller 130.

In embodiments where occupant aid system 100 comprises location device 160, controller 130 may be further operable to record the position of the vehicle. Accordingly, the transmitted information may be further based, at least in part, on the position. In some embodiments, when the information comprises one or more image, the position may be associated with the one or more image. In embodiments where occupant aid system 100 is further operable to respond to a question and/or a command, the response may be based, at least in part, on the position.

In some embodiments, occupant aid system 100 may further comprise one or more additional sensor 170. An additional sensor 170 may be an accelerometer, a speedometer, a compass, an ambient light sensor, a thermometer, and a clock. Each additional sensor 170 is operable to capture data. In such an embodiment, memory 131 may be operable to record the data for the predetermined period of time. Accordingly, the transmitted information may be further based, at least in part, on the data.

In some embodiments, occupant aid system 100 may further comprise a display 180. Display 180 may be operable to display one or more images. Further, display 180 may be disposed in the rearview assembly. Accordingly, display 180 may be oriented such that a vehicle occupant, such as the driver, may view the one or more images. Display 180 may also be communicatively connected to controller 130.

In embodiments where occupant aid system 100 comprises display 180, controller 130 may be further operable to transmit one or more images to display 180 upon initiation of a trigger. Accordingly, controller 130 may comprise an image generation algorithm. In some embodiments, the one or more images may be based, at least in part, on portions of the one or more images captured by imager 120. In other embodiments, the one or more images may be portions of the text converted from the recorded sound. Further, the portions of the one or more images captured by imager 120 and/or of the text may be selected based, at least in part, on the question and/or command.

In some embodiments, occupant aid system 100 may further comprise a speaker 190. Speaker 190 may be operable to emit an auditory response. The auditory response may operably be heard by an occupant of the vehicle, such as the driver. In some embodiments, speaker 190 may be disposed in the rearview assembly. Further, speaker 190 may be communicatively connected to controller 130.

In embodiments where occupant aid system 100 comprises speaker 190, controller 130 may be further operable to transmit an auditory signal to speaker 190 for emission as the auditory response, based, at least in part, on the initiation of a trigger. Accordingly, controller 130 may comprise an auditory response generation algorithm. The auditory signal may be based, at least in part, on portions of the captured sound, on the pattern recognition analysis results, and/or on portions of the one or more images captured by imager 120. Further, the portions of the captured sound and/or the portions of the one or more images captured by imager 120 may be selected based, at least in part, on the question and/or command. Thus, the auditory signal may be based, at least in part, on the response. In some embodiments, the auditory emission may be a part of the recorded, captured sound. In other embodiments, the auditory emission may be an algorithmically generated voice response based, at least in part, on a response to the question and/or command in conjunction with the portions of the captured sound and/or the portions of the captured one or more images.

In operation, the microphone 110, imager 120, location device 160, and/or additional sensors 170 collect respective data. In some embodiments, controller 130 may record and store the respective data in memory 131 for the predetermined period of time. In other embodiments, controller 130 may record and store the respective data in memory 131 during a requested time.

In some embodiments where controller 130 may record and store the respective data for the predetermined period of time, the predetermined period of time may be equal to or less than about 5 minutes, 2 minutes, 1 minute, 45 seconds, 30 seconds, 15 seconds, or 10 seconds. During this time, the vehicle may be traveling. An occupant of the vehicle may then experience a moment they wish to preserve or revisit to re-experience or more thoroughly experience. Accordingly, the occupant may initiate a trigger, such as by actuating button 150. Upon initiation of the trigger, information may be sent to remote device 140 based, at least in part, on the data presently stored at the time of the trigger initiation. Accordingly, in some embodiments, the information may not be based on data collected after the trigger initiation. In some embodiments, the information may be further based, at least in part, on a command and/or question from the occupant, in order to provide a representation of the moment more accurately focused on the occupant's desired experience.

In other embodiments, an occupant may anticipate a moment they wish to preserve or review. Therefore, controller 130 may record and store the respective data during a requested time. First and second triggers may define the requested time. Accordingly, controller 130 may record and store the respective data in response to a first trigger. The first trigger may be a first operation of button 150. Further, the respective data may be recorded until the initiation of a second trigger. The second trigger may be a second operation of button 150 or exceeding a threshold of elapsed time since the first trigger. Additionally, based upon the second trigger, controller 130 may transmit information to remote device 140. The transmitted information may be based, at least in part, on the data recorded and stored between the first and second triggers. In some embodiments, the information may be further based, at least in part, on a command and/or question from the occupant, in order to provide a representation of the moment more accurately focused on the occupant's desired experience.

In some embodiments, the preserved moment may be experienced on demand by the occupant. Based, at least in part, on a third trigger, display 180 may display an image, based at least in part, on the preserved moment. Accordingly, controller 130 may transmit the one or more images to display 180 upon initiation of the third trigger. Additionally or alternatively, upon initiation of the third trigger, speaker 190 may be operable to emit the auditory response. Accordingly, controller 130 may transmit the auditory signal to speaker 190 upon initiation of the third trigger. The third trigger, for example, may correspond to an actuation of button 150. Alternatively, the third trigger may correspond to a question and/or command.

Embodiments of occupant aid system 100 may have the advantage of enabling a vehicle occupant to access snapshots of moments in time that the occupant may have been unable to fully process and/or observe. Such moments may encompass social moments that would otherwise be missed by dash cam. Additionally, some embodiments may have the advantage of generating better focused snapshots by determining a command and/or a question from the occupant and generating a response that focuses the moment's content to the occupant's intent.

As used herein, the term "and/or," when used in a list of two or more items, means that any one of the listed items can be employed by itself, or any combination of the two or more of the listed items can be employed. For example, if a composition is described as containing components A, B, and/or C, the composition can contain A alone; B alone; C alone; A and B in combination; A and C in combination; A and C in combination; B and C in combination; or A, B, and C in combination.

The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

It is to be understood that although several embodiments are described in the present disclosure, numerous variations, alterations, transformations, and modifications may be understood by one skilled in the art, and the present disclosure is intended to encompass these variations, alterations, transformations, and modifications as within the scope of the appended claims, unless their language expressly states otherwise.

What is claimed is:

1. A system comprising:
  a rearview assembly operable to provide a user with a view rearward a vehicle, the rearview assembly comprising
  a button;
  a microphone;
  a display disposed in the rearview assembly, the display operable to display a first image;
  an imager operable to capture a second image having a field of view of an interior of the vehicle; and
  a controller communicatively connected to the button, the microphone, the display, and the imager, the controller operable to:
    record sound from the microphone for a predetermined period of time,
    transmit information to a remote device based, at least in part, upon initiation of a trigger, the information based, at least in part, on the recorded sound,
    record the second image captured by the imager for a period of time, and
    upon initiation of the trigger, transmit the first image to the display, the first image based, at least in part, on the second image.

2. A vehicle occupant aid system comprising:
  a rearview assembly operable to provide an occupant with a view rearward relative to a vehicle under normal operating conditions, the rearview assembly comprising a button accessible for the occupant to manipulate;
  a microphone operable to capture sound from an interior of the vehicle;
  a location device operable to determine a position of the vehicle;
  a first imager having a field of view of the interior of the vehicle, the first imager operable to capture one or more first images;
  a clock; and
  a controller in communication with the button, the microphone, the location device, the first imager, and the clock, the controller configured
    (a) to determine, from the sound that the microphone captured, a name of a song audible within the interior of the vehicle when the occupant manipulated the button,
    (b) to determine, from the one or more first images that the first imager captured, an identity of the occupant and any other occupants that were occupying the vehicle when the occupant manipulated the button, and
    (c) to transmit to a mobile personal communications device, as a consequence of the user manipulating the button, (i) the name of the song, (ii) the position of the vehicle when the user manipulated the button, (iii) the one or more first images captured by the first imager corresponding to a predetermined period of time before the occupant manipulated the button, (iv) the identity of the occupant and any other occupants, and (v) a time, from the clock, when the user manipulated the button.

3. The vehicle occupant aid system of claim 2 further comprising:
  a second imager having a field of view forward of the vehicle, the second imager operable to capture one or more second images,
  wherein, the controller is in further communication with the second imager, and
  further wherein, the controller is further configured to transmit to the mobile personal communications device, as a consequence of the user manipulating the button, the one or more second images captured by the second imager corresponding to the predetermined period of time before the user manipulated the button.

4. The vehicle occupant aid system of claim 2, wherein the button is a physical hard key button.

5. The vehicle occupant aid system of claim 2, wherein the button is a touchscreen soft key button.

6. The vehicle occupant aid system of claim 2, wherein the controller is further configured to transmit to the mobile personal communications device the sound from the interior of the vehicle that the microphone captured corresponding to the predetermined period of time before the occupant manipulated the button.

7. The vehicle occupant aid system of claim 2, wherein the controller is further configured (i) to convert to text the sound from the interior of the vehicle that the microphone captured corresponding to the predetermined period of time before the occupant manipulated the button and (ii) to transmit to the mobile personal communications device the text.

8. The vehicle occupant aid system of claim 2 further comprising:
one or more of an accelerometer, a speedometer, a compass, an ambient light sensor, and a thermometer in communication with the controller,
wherein, the controller is further configured to transmit to the mobile personal communications device, as a consequence of the user manipulating the button, information derived from output from the one or more of the accelerometer, the speedometer, the compass, the ambient light sensor, and the thermometer corresponding to when the occupant manipulated the button.

9. The vehicle occupant aid system of claim 2, wherein the rearview assembly further comprises a display that provides the occupant with the view rearward relative to the vehicle, and
the display is in communication with a camera and is operable to display one or more images captured by the camera.

10. The vehicle occupant aid system of claim 9, wherein the display is in further communication with the controller.

11. The vehicle occupant aid system of claim 2, wherein the rearview assembly is centrally mounted to a headliner or windshield of the vehicle.

12. The vehicle occupant aid system of claim 2, wherein the first imager is incorporated into the rearview assembly.

13. The vehicle occupant aid system of claim 2, wherein the controller is incorporated into the rearview assembly.

14. The vehicle occupant aid system of claim 2, wherein the controller is cloud based.

15. The vehicle occupant aid system of claim 2, wherein the location device is a global positioning system unit or cellular triangulation unit.

16. The vehicle occupant aid system of claim 2, wherein the predetermined period of time is within a range of from 10 second to 5 minutes.

17. A vehicle occupant aid system comprising:
a rearview assembly operable to provide an occupant with a view rearward relative to a vehicle under normal operating conditions, the rearview assembly comprising a button accessible for the occupant to manipulate with a first push and a second push after the first push;
a microphone operable to capture sound from an interior of the vehicle;
a location device operable to determine a position of the vehicle;
a first imager having a field of view of the interior of the vehicle, the first imager operable to capture one or more first images;
a clock; and
a controller in communication with the button, the microphone, the location device, the first imager, and the clock, the controller configured
(a) to determine, from the sound that the microphone captured, a name of a song audible within the interior of the vehicle during a period of time beginning when the occupant made the first push of the button and ending either (i) when the occupant makes the second push of the button or (ii) a preset period of time after the first push of the button,
(b) to determine, from the one or more first images that the first imager captured, an identity of the occupant and any other occupants that were occupying the vehicle during the period of time, and
(c) to transmit to a mobile personal communications device, as a consequence of the occupant doing the second push of the button, (i) the name of the song, (ii) the position of the vehicle during the period of time, (iii) the one or more first images captured by the first imager corresponding to the period of time, (iv) the identity of the occupant and any other occupants, and (v) a time, from the clock.

18. The vehicle occupant aid system of claim 17, wherein the period of time ends when the user makes the second push of the button.

19. The vehicle occupant aid system of claim 17, wherein the period of time ends the preset period of time after the first push of the button.

20. The vehicle occupant aid system of claim 17, wherein the rearview assembly further comprises a display that provides the occupant with the view rearward relative to the vehicle,
the display is in communication with a camera and is operable to display one or more images captured by the camera,
the display is in further communication with the controller,
the button is accessible to the occupant to manipulate with a third push after the second push, and
the controller is further configured to, as a consequence of the user doing the third push of the button, cause the display to display the one or more first images captured by the first imager corresponding to the period of time.

* * * * *